Oct. 19, 1965

R. F. WONNEMAN 3,212,175

ROTARY APPARATUS FOR CONTINUOUSLY ASSEMBLING
FLEXIBLE CURVED DIP TUBED CLOSURE
ASSEMBLIES TO CONTAINERS

Filed Feb. 21, 1964

INVENTOR.
ROMAN FRANCIS WONNEMAN

Oct. 19, 1965  R. F. WONNEMAN  3,212,175
ROTARY APPARATUS FOR CONTINUOUSLY ASSEMBLING
FLEXIBLE CURVED DIP TUBED CLOSURE
ASSEMBLIES TO CONTAINERS
Filed Feb. 21, 1964  5 Sheets-Sheet 2

INVENTOR.
ROMAN FRANCIS WONNEMAN

FIG. 6

INVENTOR.
ROMAN FRANCIS WONNEMAN

Oct. 19, 1965

R. F. WONNEMAN

3,212,175

ROTARY APPARATUS FOR CONTINUOUSLY ASSEMBLING
FLEXIBLE CURVED DIP TUBED CLOSURE
ASSEMBLIES TO CONTAINERS

Filed Feb. 21, 1964

INVENTOR.
ROMAN FRANCIS WONNEMAN

Oct. 19, 1965 R. F. WONNEMAN 3,212,175
ROTARY APPARATUS FOR CONTINUOUSLY ASSEMBLING
FLEXIBLE CURVED DIP TUBED CLOSURE
ASSEMBLIES TO CONTAINERS
Filed Feb. 21, 1964 5 Sheets-Sheet 5

INVENTOR.
ROMAN FRANCIS WONNEMAN

United States Patent Office

3,212,175
Patented Oct. 19, 1965

3,212,175
ROTARY APPARATUS FOR CONTINUOUSLY
ASSEMBLING FLEXIBLE CURVED DIP TUBED
CLOSURE ASSEMBLIES TO CONTAINERS
Roman Francis Wonneman, 9621 Harding Ave.,
Baltimore, Md.
Filed Feb. 21, 1964, Ser. No. 346,501
14 Claims. (Cl. 29—208)

This invention relates in general to apparatus for assembling dip tube closures to containers, and more particularly to a continuous rotary motion apparatus for assembling dip tube closures to spray type containers and pressure cannisters with the use of a multiple number of assembly heads each of which operates in the general manner described in my copending parent application No. 346,543 filed of even date herewith entitled Apparatus for Applying Dip Tube Closures to Containers of which this application is a continuation-in-part.

The principal object of this invention is to provide apparatus in which flexible curved dip tube closures are assembled to containers while a number of containers are carried in a continuously moving rotating path of travel in a manner in which each of an annular series or set of assembly units is radially mounted in position as to be movable in unison around a common axis with an annular series or set of container carrying supporting parts, and preferably as vertically adjustable parts of a circular table.

A more specific objective of the present invention is the novel conception of a multiple number of assembly units embodying the generic system of parts described in my aforesaid copending application but especially adapted for applying gripping and guiding the closures and the operating sequence thereof in radial relation to a center hub, each unit of which is manipulated periodically during its circular path of travel by the imparted action of a stationary cam ring having a movable guide track portion and attached linkage to arcuately raise and lower an assembly head of the unit to accomplish assembly of a closure to a container.

Another object of this invention is to provide a continuous motion rotary assembly machine for assembling flexible dip tube closures to containers of various heights by elevating each container to a common assembly position so that the adjustment of the machine for adapting it for various lengths of dip tubes is minimized.

Another object of the present invention is to provide means by which a dip tube portion of a closure is forcibly driven into the container during assembly and by which the cap portion of the closure may be either forcibly driven into the container opening, or lightly placed thereon.

Another object of the present invention is to provide means by which each closure is transferred from a closure feed chute to each assembly head of the units during their upward position and while in a continuously rotating path of travel.

A further and important objective of the invention is to provide a rotary continuous motion machine for assembling flexible curved, or flexible straight dip tube closures to containers which will operate with closures and or containers of a magnetically permeable or magnetically impermeable materials or combinations thereof, and with containers having dimensionally inconsistent heights.

Another objective of this invention is in the manner by which the flexible dip tube portion of the closure assembly is distorted axially to align the dip tube extremity with the container opening and by which the dip tube is guided into the container opening while said dip tube tends to return to its normal axial arcuate shape so that the dip tube extremity is correctly located inside the container after its insertion therein.

Another objective of this invention is in the manner by which a closure assembly is automatically and temporarily retained in the closure feed chute in the absence of a container beneath an assembly head.

In addition to the general objectives recited, the invention has for further objectives such other improvements and advantages in construction and operation as may be found inherent in the structure and operation hereinafter described or claimed.

The general features of the machine of my aforesaid parent copending application comprising a closure pressure applying member, a closure cap gripping element, and a tube guide member are used in the present invention in multiple assemblies each of which moves in an arcuate path as in said application. The operating sequence of each assembly unit in the present specification therefore is generically identical to that described in my aforesaid copending application. The general detailed construction of each assembly unit in the present invention is different from that described in my said copending application, so as to provide a design suitable for application of the units for use in rotary continuous motion where each unit and container travel in unison with each other in a horizontally disposed circular path of travel, with an actuating means for arcuately moving each assembly head and its tube guide from an upper to a lower level, and with an actuating means for rectilinearly moving each container from a lower to an upper level.

The accompanying specifications and drawings show, for purposes of exemplification a preferred form and best mode in which the foregoing and generic features of my copending application aforesaid are employed in a manner to embody said general or generic features in accordance with the present invention in a continuous rotary motion apparatus for assembling a multiplicity of flexible curved dip tube closures to like multiplicity of containers. The invention, however, is not limited in all its aspects to this preferred best mode of construction since the novel features of this invention may be used with the generic features of my aforesaid copending applications in other ways and means and for other uses such as pneumatic, hydraulic, or electrical means for manipulating the assembly heads and containers to the required sequence of operations. Still other means comprising multiple numbers of inline unit apparatus affixed to the circular table portion of the present invention instead of the present arcuately rotatable assembly heads such as for example those employing the general features of my copending application No. 347,075 filed of even date herewith and entitled Inline Apparatus for Assembling Flexible Curved Dip Tube Closures to Containers, are contemplated to be employed to embody said features in line in superposed relation to the container under each unit on the circular table for straight line operation of the pressure applying, tube guide members, and gripping elements. Still other means comprising the generic system of parts employed in the said copending application may be employed as sensing and escapement apparatus for the release of individual closures from an alignment thereof in the present alignment chute. Further as is shown in the accompanying illustrations the generic system of parts in latched engagement employed in said copending application for gravitational operation of the tube guide member may be employed instead of cams and cam followers presently used to raise and lower said member.

Hence the invention in its broader aspects is not to be limited to the specific means and manner herein described as a preferred form by way of a best mode of specifically embodying the invention for such continuously rotating motion, construction and operation.

Referring to the drawings.

Figure 1:
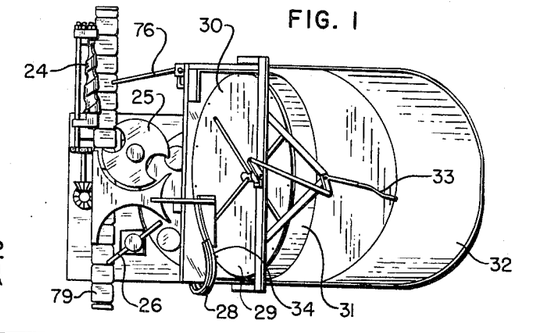
FIGURE 1 is a top plan view of the preferred mode of embodying the invention with means for individually feeding dip tube closures to the alignment chute from a random quantity of closures which is the subject of my copending application Serial Number 284,406, filed May 31, 1963.
Figure 2:
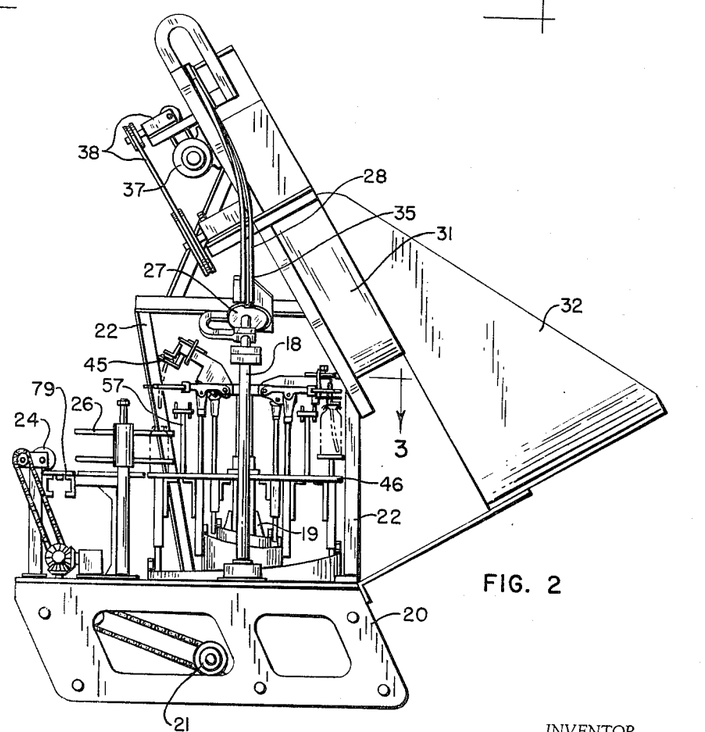
FIGURE 2 is a side elevational view of the apparatus as shown in FIGURE 1.
Figure 3:
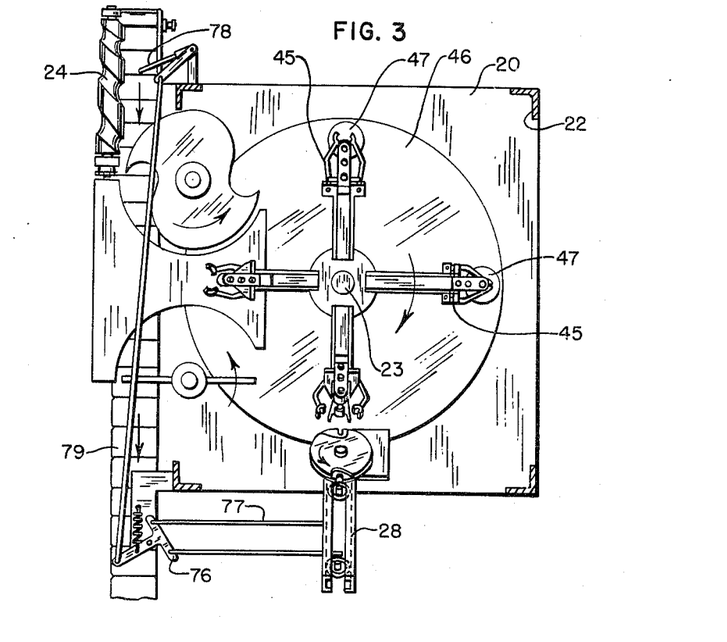
FIGURE 3 is a top plan view taken along lines 3—3 of FIGURE 2 to illustrate with directional arrows, the travel path of the containers and rotational direction of the circular table, assembly heads and cap feed starwheel. This view also illustrates the mechanical system of linkages employed to release individual closures from an alignment thereof in an alignment chute by the action of a container moving past a sensing element.

Referring to the drawings, FIGURES 1, 2, and 3 in particular, the rotary apparatus for continuously assembling flexible dip tubed closures to containers comprises, in general, a main base 20 having an enclosed motor drive 21, container feed means comprising a timing worm 24, a cammed starwheel container feed 25 and a horizontally disposed conveyor 79 which carries successive alignments of individual upright containers to the feed worm 24 which worm separates individual containers from the alignment thereof and lineally accelerates the individual containers so separated to a velocity equal to that of the cammed starwheel container feed 25 for the starwheel to receive the container and transfer same to container platforms 47 in an annular carrier plate 46 without interrupting smooth movement of the container during said transfer, the conveyor 79 is mounted on the main base 20 in surface alignment with the carrier plate 46 and in transverse relation to said plate and the starwheel feed 25 is also mounted on the main base 20 in spaced superposed relation to both the conveyor 79 and the plate 46 by means of an upright pedestal and is driven by the drive means 21 in continuous uninterruptetd rotative motion, container discharge means in the form of a spoked wheel member 26 which is also mounted on the main base 20 and driven by the drive means 21 in continuous uninterrupted rotative motion and is in a spaced superposed relation to both the conveyor 79 and carrier plate 46 and is in position on said base 20 to receive an assembled container from the container platforms 47 for transfer of same to the conveyor 79, dip tubed closure assembly feed means 18 pedestal mounted on the main base 20 and driven by said drive means 21 for driving an angularly disposed closure feed starwheel disc 27 in continuous uninterrupted rotative motion and is positioned in counterclockwise 90° relation to said discharge wheel 26 on the main base 20 and so that said disc 27 is in above offset relation to the carrier plate 46, closure assembly feed chute means 28 affixed to the frame for the disc 27 and in feeding relation to said disc 27, carrier plate drive shaft means 23 powered for continuous uninterrupted rotative motion by the drive means 21 and rotatably affixed to the main base 20 in pedestal 19 for horizontal rotation about a vertically disposed common axis, horizontally disposed carrier plate means 46 in superposed spaced relation to said base 20 and positioned there in surface alignment with said conveyor 79 in offset relation thereto and affixed to said drive shaft 23 for rotation in unison therewith in a horizontal plane around said common axis, an annular set of container platforms 47 movably affixed to said plate means 46 in equal radial and annular spaced relation radially outward from said common axis, an annular set of assembly units 45 each one of which is mounted in equal radial and annular spaced relation to each other above the carrier plate means 46 to a collar 43 affixed to the drive shaft means 23 for rotative movement of said assembly units 45 in unison with said plate means 46 around said common axis with each one of said assembly units 45 being in radial alignment with each one of the container platforms 47 in said carrier plate means 46. For purposes of exemplification one form of closure assembly automatic feeding means 32 is shown at FIGURES 1 and 2 to generally illustrate means by which an individual closure assembly is elevated from a random quantity thereof and delivered to the feed chute means 28 at a rate sufficient enough to keep the chute means 28 filled with an alignment of closures while the said starwheel disc 27 continuously and successively removes individual assemblies therefrom for transferring same to each one of the assembly units 45. The automatic feeding means 32 generally comprises elevating means in the general form of a disc 30, a secondary support 31 and a primary support below the secondary support and integral separate power drive means 37. In general, the feeding means 32 is angularly disposed superposed above the carrier plate 46 and assembly units 45 of the rotary apparatus and is supported on the main base 20 by a series of legs 22 and operates to feed individual closure assemblies to the feed chute means 28 by first elevating a random quantity of closures from the primary support to the secondary support 31 by means of lifting fingers 33 where individual ones of said closures are removed from said random quantity by pickup buttons on a rotating elevating disc 30 and elevated to a level higher than said secondary support at which level each closure assembly is automatically and slidably fed into the chute means 28 with the dip tube portions of each said closure assembly extending downwardly.

Figure 6:
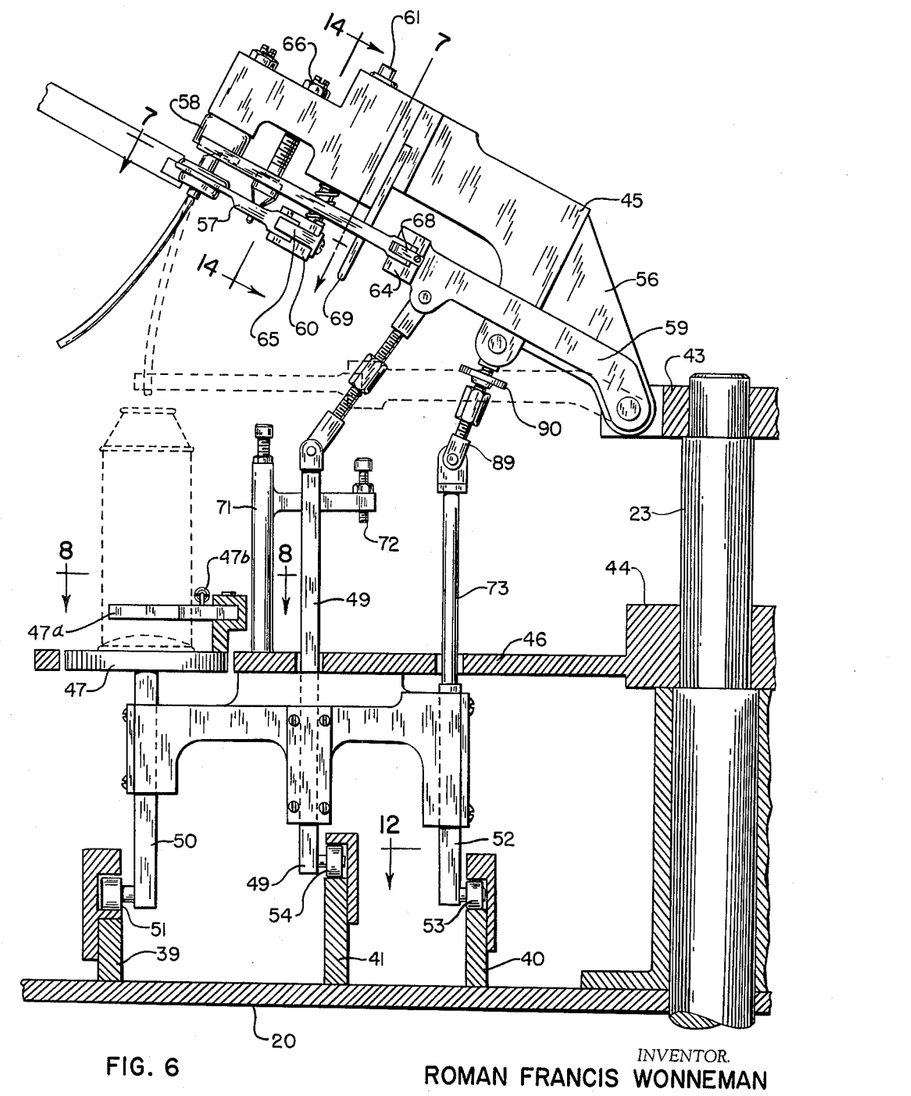
FIGURE 6 is a sectional view in elevation taken along lines 6—6 of FIGURE 3 to illustrate relative positions of the closure applying and tube guide member at their position at an upper level in offset relation to a container (shown in dotted lines) on an elevating platform portion of the circular table. This view also illustrates the system of parts comprising stationary cams affixed to a stationary base, cam followers, slides and connecting linkages employed for sequential operation of the said members, container platform, tube guide and gripping elements.
Figure 7:
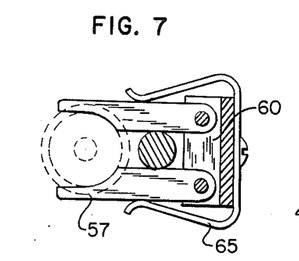
FIGURE 7, taken along lines 7—7 of FIGURE 6, is a partial sectional plan view of the gripping element portions of the assembly head.

Each one of the assembly units 45 comprises a closure applying member 56 and a dip tube guide member 59 as shown in FIGURE 6 with separate actuating means in the general form of a pair of radial rocker arms pivotally mounted to the collar 43 on the vertical drive shaft means 23. The closure applying member 56 generally comprises a housing mounted radially outward from the drive shaft means 23 on one of the pair of rocker arms, an elongated annular pressure applying member 58 transversely affixed to said housing in up and down relation thereto, a horizontally disposed pair of gripping elements 57 in position below said pressure applying member 58 and manipulative means in the general form of elongated annular cam 66. The gripping elements 57 comprise a pair of jaws horizontally disposed on a bar 60 and arcuately rotatable therein against the action of a leaf spring 65 and are slidably affixed in up and down transverse relation to said housing by means of a slide bar 61 around which a compression spring is slidibly assembled to normally urge the bar 60 and the gripping elements 57 away from said housing downwardly from said pressure applying element member 58 to define a space between said member 58 and the gripping elements 57 so that cap portions 81 of an individual closure assembly are forcibly transferred from the starwheel disc 27 slidibly into said gripping elements without hinderance by said pressure applying member 58. Thus it will be observed that when the bar 60 is slidably moved upward in said housing against the action of said compression spring, the gripping elements 57 meet and are separated by the cam 66 against the action of the leaf spring 65 to release the closure cap portions 81 when such are grasped in said gripping elements, and that the pressure applying member 58 is adapted to slide upwardly in said housing against the action of another compression spring for adapting same to be operable with containers of minutely different heights and for regulating the pressure to be exerted on the closure cap 81 when same is assembled to a container. The dip tube guide member 59 generally comprises a housing mounted radially outward on the other one of the said pair of radial rocker arms and is radially inward toward the vertical shaft means 23 from the housing portion of the closure applying member 56 and a pair of horizontally disposed tube guide elements arcuately movable in the housing of said tube guide member against the action of a tension spring 68 which normally tends to urge said elements together. The closure applying member rocker arm and tube guide member rocker arm are pivotally mounted on a shaft in the collar 43 and are in position thereon in relation to each other so that the housing of the closure applying member is centered above said pair of tube guide elements 63. Manipulative means in the form of a bar cam 69 are affixed to the housing of the closure applying member 56 for separating said tube guide elements and moving same out of interfering relation with the path of the gripping elements 57 and the pressure applying member 59 when they are seating a closure assembly onto a container. Sequence control operating means in the general form of a plurality of stationary circular cam rings 40, 41, and 39 are affixed to the main base 20 around said common axis as common means for moving each one of the separate assembly units and their respective members from an upper to a lower level in pivotal relation to said collar 43, and as common means for elevating each one of the separate container platforms from surface alignment with said carrier plate 46 to an upper level. For slidably guiding the upward and downward movement of separate cam follower linkages affixed to each closure applying member rocker arm and to each dip tube guide member rocker arm, and to each container platform, separate casings are affixed to underneath surface portions of the carrier plate 46 as shown in FIGURE 6, wherein said separate linkages are slidably affixed in annular alignment with their respective cam. The cam follower linkage for moving the closure applying member comprises a cam follower 53 affixed to an operating rod 52 with the follower in position to be moved upwardly and downwardly by the stationary cam ring 40, operating rod extension 73 affixed in axial alignment with said rod 52, and a connecting linkage 89 movably affixed at one lower end to the extremity of the extension 73 and movably affixed at one upper end to the actuating means rocker arm portion of the closure applying member 56. The cam follower linkage for moving the tube guide member 59 comprises a cam follower 54 affixed to its operating rod 49 with the follower in position to be moved upwardly and downwardly by a separate stationary cam ring 41, and a connecting linkage movably affixed to the uppermost extremity of the rod 49 and movably affixed to the actuating means rocker arm portion of the tube guide member 59. The cam follower linkages for moving each container platform for elevating containers of different heights to a common assembly location comprises a cam follower 51 affixed to its operating rod 50 with the follower in position to be moved upwardly and downwardly by another separate stationary cam ring 39.

Each one of the rocker arm actuating means in each one of the assembly units 45 is pivotally movable on their common shaft in said collar 43 for downward movement of the closure applying member 56 and the dip tube guide member 59 of each assembly unit through an arcuate path of travel in guiding and applying the dip tube 80 and cap portions 81 of a dip tubed closure assembly to an upright container. Said applying member 56 and guide member 59 are moved downward as stated in sequentially timed relation to each other by their respective rocker arm actuating means, operating rods and linkages, and cam followers in their operative relationship to said cams as described, while the assembly units are in an uninterrupted circular path of travel around said common axis.

Figure 4:
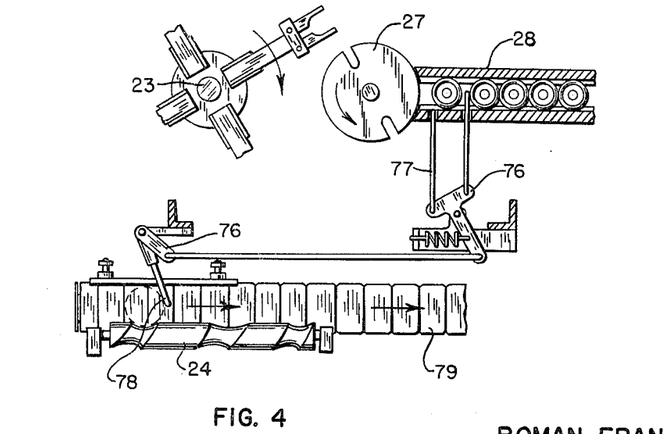
FIGURE 4 is a diagrammatic view of the system of parts, slightly enlarged, employed to release individual closures from said alignment thereof and means for gravitately receiving said individual closure to transfer it forcibly into gripping element portions of an assembly head.
Figure 5:
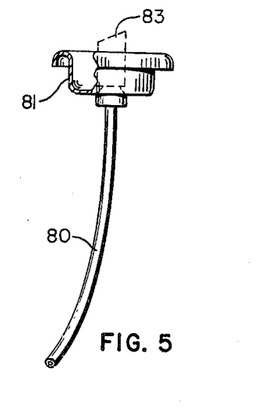
FIGURE 5 illustrates one type of flexible dip tube closure, with the operating button shown in dotted lines, used in the present invention.

As shown in FIGURE 4, the closure feed chute 28 comprises a pair of spaced apart members having opposed trackways for slidably receiving cap portions of individual closure assemblies and guiding their descent by gravity from an upper level in said chute to a closure feed starwheel feed disc 27 at a lower level at the discharge portion of said chute and escapement means in the general form of a pair of elongated rods 77 which move alternately into and out of said path of descent of the individual closure assemblies in an alignment thereof in said chute for the release of an individual closure assembly to the feed disc 27 only when a container is present in the container feed means. A sensing lever 78 in superposed spaced relation to the container conveyer 79 is also in interfering relation to the path of travel of individual containers on said conveyor and in the feed worm 24 and is connected to the escapement rods 77 by a linkage. Arcuate movement of the sensing lever 78 in a horizontal plane of movement occurs when an individual container impinges and passes said lever and said arcuate movement is converted to rectilineal movement for moving said rods 77 by the linkage portions of the escapement means.

Figure 8:
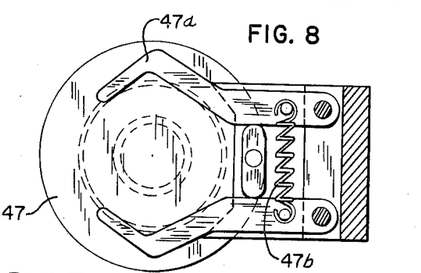
FIGURE 8 illustrates means employed to grip and align individual containers on the elevating platform portion of the circular table and is a partial sectional plan view taken along lines 8—8 of FIGURE 6.
Figure 9:
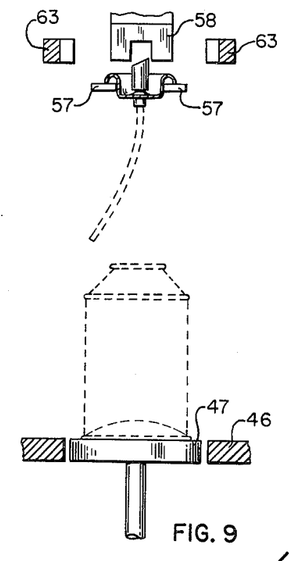
FIGURES 9, 10, and 11 are diagrammatic sectional views of the sequence of operations of the tube guide members, gripping elements and container platform employed to insert dip tube closures into containers on a continuously rotating circular table.
Figures 10, 11:
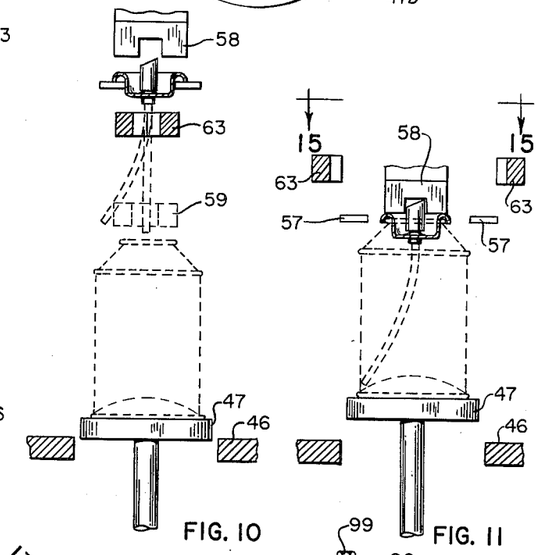
Figure 12:
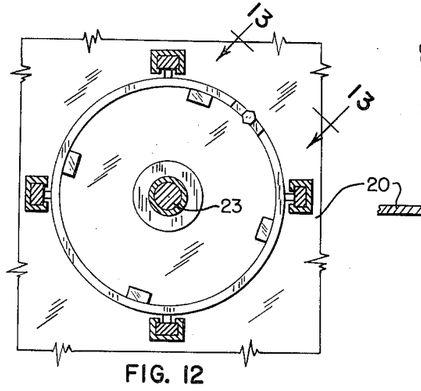
FIGURE 12 is a partial sectional plan view in elevation of the stationary assembly head cam affixed to the stationary base plate of the apparatus and is taken at 12 on FIGURE 6.

Referring to FIGURE 8, a container locator 47a in the general form of a pair of spring biased centering elements are affixed in superposed relation to each one of the container platforms 47 for movement in unison therewith as means for grasping each container from the feed starwheel 25 and for aligning each said container on said platform in position to receive a closure from the assembly unit 45 in radial alignment therewith.

Referring again to FIGURE 6, the cam 41 which operates the actuating means for the tube guide member 59 moves said member downwardly toward the carrier plate 46 until the dip tube guide elements 63 depart the bar cam 69 and are urged together under the action of the spring 68 and moves the member still further in downward direction until the actuating means portions of the tube guide member 59 are initially arrested from further downward movement by gradual impingement of said means on a tube length gage stop 90 which is adjustably affixed to the linkage 89 and is in interfering relation to the downward path of arcuate movement of said actuating means. When arrested as stated the tube guide member 59 is in gravity contact with said gage stop 90 and the cam roller follower 54 is suspended above the cam 41.

With the feed worm 24 and all other elements and members of the apparatus in a circular path of travel in continuous uninterrupted rotative motion and an alignment of containers on the moving conveyor 79, the feed worm separates an individual container from the alignment thereof and moves it past the sensing element 78 portion of the escapement means 76 to actuate the rods 77 for the release of an individual closure assembly to the feed disc 27 for transfer of same to the gripping elements 57 in an assembly unit 45 which unit, as shown in FIGURE 6, is at its upper level in transfer relation to the feed disc 27. The cap portions 81 of an individual closure assembly with dip tube portions extending downwardly is grasped by said gripping elements 57 as they pass said disc in a circular path of travel, and the cams 40, 41, are shaped to sequentially move first the tube guide member 59 arcuately downward for movement of the tube guide elements into partial surrounding relationship with dip tube portions of the closure assembly grasped in said gripping elements and for further movement of said guide elements downwardly along said dip tube to be arrested at the extremity of said dip tube by the impingement of the rocker arm actuating means of the tube guide member 59 on the tube length gage stop 90, secondly to move the closure applying member 56 with said closure assembly grasped in the gripping elements 57 and the dip tube guide member in unison to a lower level above the opening of a container on one of the platforms in the carrier plate at still a lower level at which lower level the dip tube is guided in position to enter the opening of said container and at which lower level further downwardly arcuate movement of the dip tube guide member 59 is arrested by an abutment in interfering relation to the downward path of arcuate travel of said tube guide member 59 while the closure applying member 56 continues in its downward path of arcuate movement driving the dip tube into the container opening and after portions of said dip tube are substantially into the container, the dip tube guide element bar cam 69 on the housing of the closure applying member engages and spreads apart the pair of tube guide elements against the action of the tension spring 68 for movement of same out of interfering relation to the continuing path of travel of the gripping elements 57 as said elements continue their downward movement to a lower level for seating portions of the closure cap 81 onto the container opening at which level further downward movement of said gripping elements is arrested by impingement of the gripper element bar 60 on an abutment in interfering relation to the further downward travel of said bar at which level said gripping elements 57 are spread apart against the action of the leaf spring 65 by the cap jaw separating cam 66 for the release of said closure to the following action of the pressure applying member and for movement of said gripping elements out of the path of travel of said applying member as it passes said gripping elements to apply pressure to the closure cap seated on the container opening. After an individual container is transferred from the conveyor 79 to a platform 47 in the carrier plate 46 by the starwheel 25, the container elevating cam 39 is sequentially timed in relation to aforesaid assembly unit movements to elevate the opening of the container to a common assembly location. For adapting the rotary apparatus to be operable with containers of different heights the cam 39 comprises segmented track portions which are removable for replacement with other segmented portions. For adapting the rotary apparatus to be operable with closure assemblies having dip tubes of different lengths, the tube length gage 90 on the closure applying member linkage 89 is adjustably moved upward or downward on said linkage, and the cam 41 is provided with removable segmented portions which are replaced with other segmented portions for varying the arcuate downward movement of the tube guide member rocker arm actuating means so that same is gently lowered to the gage 90. It is to be here noted that regardless of the height of the container or the length of the closure assembly dip tube the dip tube guide member 59 and its guide elements 63 are always, when at their lowest level, in consistent spaced relation above the common assembly position to which each container is elevated, and that the stroke of the operating rod 52 is always consistent regardless of the height of a container on a platform and regardless of the length of the dip tube portion of a closure assembly.

Figure 13:
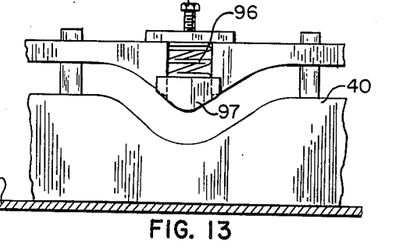
FIGURE 13 is a side view in elevation along lines 13—13 of FIGURE 12 to illustrate resilient portions of the stationary cam employed to lower the assembly head to its closure inserting position.
Figure 14:
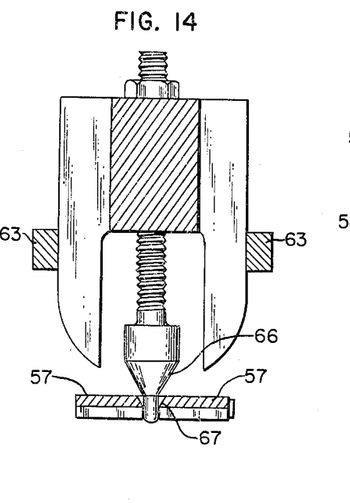
FIGURE 14 is a sectional plan view taken along lines 14—14 of FIGURE 6 to illustrate manipulative means for the tube guide arms and gripping elements for sequential operation thereof.
Figure 15:
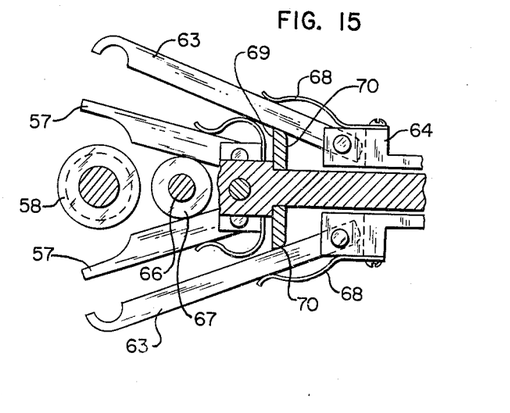
FIGURE 15 is a sectional plan view in elevation of the gripping elements, pressure applying member, tube guide member and their manipulative means at their lower level where a closure assembly is assembled to a container and is taken along lines 15—15 of FIGURE 11.

In adapting the rotary apparatus operable with containers of minutely different heights other means may be used rather than the resiliently movable pressure applying member as previously described such as for example as shown in FIGURE 13, the cam 40 may be provided with a resiliently movable segmented portion 97 which is slidably movable upward and downward against the action of a compression spring 96 in upper track body portions of said cam where the closure applying pressure element pressure is adjustably set by the threaded member 99 for varying same in applying a closure to a container opening.

Figure 16:
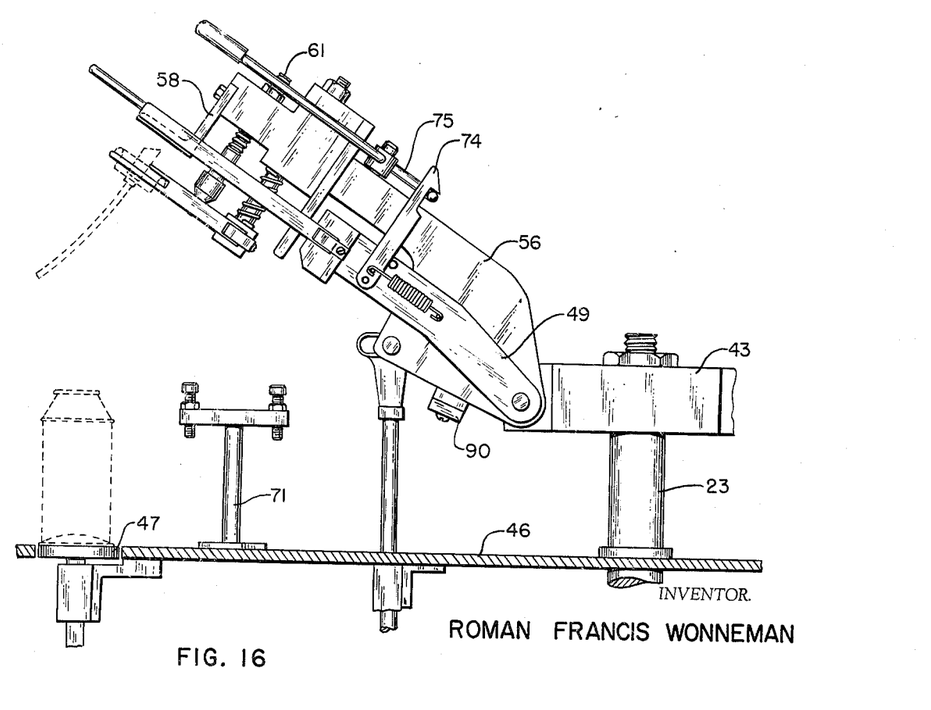
FIGURE 16 is a view similar to FIGURE 6 and is a side view in elevation of another embodiment of an assembly head and illustrates latching means rather than a cam and follower linkages for moving the tube guide member in unison with the closure applying member from a lower to upper level.

Still, other means may be used rather than the cam 41 and cam follower linkages 49 for moving the tube guide member from its said lower to its upper level in unison with the closure applying member 56 such as for example, as shown in 16, where latching means in the form of a latch 74 are tension spring loaded for latching engagement of said latch 74 with a horizontally disposed latch trip 75 on the actuating means rocker arm portions of the closure applying member for engagement of said latching means when the closure applying member of each one of the assembly units is at its lowest level in assembling a dip tubed closure to a container.

I claim:

1. Rotary apparatus for assembling successive individual dip tubed closure assemblies to successive individual upright containers comprising in combination; a main base, power drive means on said base for driving apparatus for continuously assembling individual flexible dip tubed closure assemblies to successive individual upright partially filled containers in continuous uninterrupted motion in a circular path of travel, carrier plate drive shaft means powered for continuous uninterrupted rotative motion rotatably affixed to said base for horizontal rotation about a vertically disposed common axis, horizontally disposed carrier plate means in superposed spaced relation to said base and affixed to said shaft for rotation in unison therewith in a horizontal plane around said axis, and annular set of individual container platforms mounted on said plate in equal radial and annular spaced relation radially outward from said common axis, an annular set of separate individual assembly units mounted in equal radial and annular spaced relation to each other and in spaced relation above said plate for rotative movement of said units in unison with said plate around said common axis with one of each of said units being in radial alignment above one of each of said platforms for movement therewith and in timed relation thereto in unison around said common axis, said assembly units each individually comprising a closure applying member and a dip tube guide member supported for movement from an upper level above one of said platforms, at which level an individual dip tubed closure assembly is to be received, to a common assembly position at a lower level at which level the applying member of said assembly unit is to first drive dip tube portions of the said closure assembly into an upright container and second to drive cap portions of said closure assembly onto the opening of said container, said closure applying member of each one of the set of assembly units comprising actuating means above said carrier plate a housing on said actuating means an upper pressure applying member in said housing and a pair of gripping elements vertically movable in said housing and in position therein below said applying element to slidably receive and grasp cap portions of said closure assembly at said upper level, said tube guide member comprising actuating means above said plate a housing on said actuating means and a pair of spring biased tube guide elements movable in said housing at said upper level for initial movement into partial surrounding relationship with dip tube portions of the closure assembly grasped in said gripping elements at said upper level to be followed by movement of said guide elements, while still in said partial surrounding relationship with said dip tube, downwardly along said dip tube to the extremity thereof at a lower level to guide same in position to enter a container opening at still a lower level, arresting means movable in unison with said closure applying member and in interfering relation to the downward path of travel of said dip tube guide member for arresting movement of said guide member at the extremity of said dip tube and for guiding further downward movement of said guide member by gravity in unison with forceful movement of said closure applying member to said common assembly position at a lower level, stationary abutment means in interfering relation to said further downward movement of said tube guide member for arresting movement of same at said common assembly position, stationary gripping element stop means in interfering relation to the downward path of movement of said gripping elements for arresting said movement of same after cap portions of a closure assembly are partially seated onto the opening of said container, and common sequence control operating means for moving the separate actuating means of the respective assembly units in a predetermined sequence during continuous rotation of said assembly units in unison about said common axis.

2. Apparatus as claimed in claim 1 and wherein said pressure applying element is movably affixed to its housing for movement therein against the action of resilient member for adapting same to be operable with successive individual containers of different heights.

3. Apparatus as claimed in claim 1 and wherein said actuating means comprises a pair of radial rocker arms pivotally mounted to a horizontal common collar affixed to the carrier plate drive shaft and wherein the housing for the closure applying member is mounted radially outward from said shaft on one of the pair of rocker arms and wherein the housing for the tube guide member is also mounted radially outward from said shaft on the other one of the pair of rocker arms for downward movement of the closure applying member and tube guide member through an arcuate path in guiding and applying the dip tube and cap portions of a dip tubed closure assembly to an upright container while the container and said closure assembly are in a circular path of travel in continuous uninterrupted rotary motion.

4. Apparatus as claimed in claim 1 and which includes a common feed chute common to each one of said assembly units for slidably guiding and pendantly supporting individual closure assemblies in an alignment thereof in said chute and for guiding their descent by gravity in a predetermined path from upper level portions of said chute to discharge portions of said chute at a lower level, said chute comprising a pair of spaced apart members having opposed trackways for slidably receiving cap portions of individual closure assemblies in position with the dip tube portions of said assemblies extending axially downward through the space between said members, transfer means at the extremity of said chute discharge portions and in aligned feeding relation to the gripping element portions of the closure applying member of each one of the assembly units when said gripping elements are at their said upper level during their movement around said common axis for the transfer of individual dip tubed closure assemblies from said chute to said gripping elements while said assembly units are in a continuously moving uninterrupted circular path of travel at said upper level around said common axis.

5. Apparatus as claimed in claim 1 and in which said common sequence control operating means comprises stationary circular cam rings and separate sets of cam follower linkages attached to each one of the separate actuating means of each one of the set of assembly units for movement of said follower linkages on said cams in unison with said assembly units around said common axis.

6. Apparatus as claimed in claim 5 and wherein said gripping elements comprise a pair of opposed radially open horizontally disposed spring biased jaws normally urged towards each other by the actions of said spring for gripping cap portions of a closure assembly said jaws being movable vertically in unison with each other in the housing of said closure applying member.

7. Apparatus as claimed in claim 5 and wherein each one of the separate assembly units includes separate manipulative means for moving the tube guide elements out of the downward path of travel of said closure gripping elements and for moving said gripping elements out of the downward path of travel of said pressure applying member.

8. Apparatus as claimed in claim 7 and wherein said manipulative means comprises cams and cam followers.

9. Apparatus as claimed in claim 1 and in which each one of said container platforms is movably affixed to said carrier plate for elevating containers of various heights to said common assembly position and wherein said common sequence control operating means includes stationary circular cam rings having removable segmented portions for replacement with other removable segmented portions and separate cam follower linkages affixed to each one of said platforms in radially aligned relation to said cam rings for the elevation of an individual container on each one of said platforms to said common assembly position as said container and platform and iam follower linkages move in unison around said common axis in continuous uninterrupted rotative motion.

10. Apparatus as claimed in claim 9 and which includes common container feed means in feeding relation to each one of the container platforms on the carrier plate for the transfer of an individual container from an alignment thereof on a horizontally disposed endless belt conveyor to each one of said platforms while said platforms are in surface alignment with said carrier plate and are in a circular path of travel around said common axis and in continuous uninterrupted rotative motion.

11. Apparatus as claimed in claim 9 and wherein each one of the separate container platforms includes a pair of spring biased centering elements affixed in superposed relation to each one of said platforms for grasping and aligning an individual container on said platform in position to receive a closure from an assembly unit.

12. Apparatus as claimed in claim 10 and which includes escapement means in discharge portions of said common feed chute for the release of individual dip tubed closure assemblies from an alignment thereof in upper level portions of said chute to said transfer means, escapement actuating means in cooperative relationship to said escapement means for moving same into and out of interfering relation to the path of descent of individual closure assemblies in an alignment thereof in said chute, sensing means for triggering said escapement actuating means into operation, said sensing means being operable by an individual container in said container feed means for triggering said escapement means into operation only when a container is present to receive a closure assembly.

13. Apparatus as claimed in claim 10 and wherein said escapement actuating means comprises electromagnetically operated air valves and air operated piston cylinders.

14. Apparatus as claimed in claim 10 and wherein said escapement actuating means comprises electromagnetically operated electric solenoids and linkages.

References Cited by the Examiner
UNITED STATES PATENTS

| | | | |
|---|---|---|---|
| 2,810,249 | 10/57 | Wysocki | 53—319 X |
| 2,914,843 | 12/59 | Petersen | 29—203 |
| 2,949,665 | 8/60 | Bergsland et al. | 29—203 |
| 3,118,218 | 1/64 | Gleason et al. | 29—211 |

WHITMORE A. WILTZ, *Primary Examiner.*

THOMAS H. EAGER, *Examiner.*